(12) United States Patent
Trivette

(10) Patent No.: US 9,603,353 B1
(45) Date of Patent: Mar. 28, 2017

(54) PERIMETER DEFENSE ASSEMBLY

(71) Applicant: James Trivette, Deep Gap, NC (US)

(72) Inventor: James Trivette, Deep Gap, NC (US)

( * ) Notice: Subject to any disclaimer, the term of this patent is extended or adjusted under 35 U.S.C. 154(b) by 461 days.

(21) Appl. No.: 14/173,046

(22) Filed: Feb. 5, 2014

(51) Int. Cl.
*A01M 29/24* (2011.01)
*A01M 1/24* (2006.01)
*A01K 3/00* (2006.01)

(52) U.S. Cl.
CPC .............. *A01M 29/24* (2013.01); *A01K 3/005* (2013.01); *A01M 1/24* (2013.01)

(58) Field of Classification Search
CPC ......... A01K 3/00; A01K 3/005; A01M 29/24; A01M 29/26; A01M 19/00; A01M 23/38
See application file for complete search history.

(56) References Cited

U.S. PATENT DOCUMENTS

| | | | | |
|---|---|---|---|---|
| 2,801,823 A | * | 8/1957 | Clements | H01B 17/145 256/10 |
| 3,747,897 A | * | 7/1973 | Conley | A01K 3/005 119/63 |
| 3,890,751 A | * | 6/1975 | Caputo et al. | E04H 17/08 52/166 |
| 4,706,941 A | * | 11/1987 | Sherdan | A01K 3/005 256/10 |
| 5,152,637 A | | 10/1992 | Wayne | |
| 5,460,123 A | | 10/1995 | Kolz | |
| 5,934,651 A | | 8/1999 | Koljonen | |
| 7,434,788 B2 | * | 10/2008 | Foster | A01K 3/00 256/1 |
| 8,293,213 B2 | | 10/2012 | Schwartz et al. | |
| 2012/0205602 A1 | | 8/2012 | Walker et al. | |
| 2013/0026432 A1 | | 1/2013 | Horvat | |

FOREIGN PATENT DOCUMENTS

| | | | | |
|---|---|---|---|---|
| BR | PI9100587 A | | 9/1992 | |
| DE | 31 12 950 | * | 10/1982 | ............ A01M 19/00 |
| DE | 33 03 077 | * | 8/1984 | ............ A01G 13/10 |
| DE | 10 2005 041 713 | * | 3/2007 | ............ A01M 29/00 |
| FR | 2 518 434 | * | 6/1983 | ............... A01K 3/00 |

* cited by examiner

*Primary Examiner* — Michael P Ferguson

(57) ABSTRACT

A perimeter defense assembly for preventing burrowing and ambulatory intruders from entering an area includes a control housing coupled to a building. A processor is coupled to the control housing. An inverter is coupled to the control housing. The inverter is operationally coupled to the processor. A base is positioned beneath a support surface. A support is coupled to the base. The support extends above the support surface. A wire is coupled to the support. The wire encompasses an area. The wire is operationally coupled to the processor. The wire is energized so the wire may repel an intruder.

8 Claims, 3 Drawing Sheets

PERIMETER DEFENSE ASSEMBLY

BACKGROUND OF THE DISCLOSURE

Field of the Disclosure

The disclosure relates to perimeter defense devices and more particularly pertains to a new perimeter defense device for preventing burrowing and ambulatory intruders from entering an area.

SUMMARY OF THE DISCLOSURE

An embodiment of the disclosure meets the needs presented above by generally comprising a control housing coupled to a building. A processor is coupled to the control housing. An inverter is coupled to the control housing. The inverter is operationally coupled to the processor. A base is positioned beneath a support surface. A support is coupled to the base. The support extends above the support surface. A wire is coupled to the support. The wire encompasses an area. The wire is operationally coupled to the processor. The wire is energized so the wire may repel an intruder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
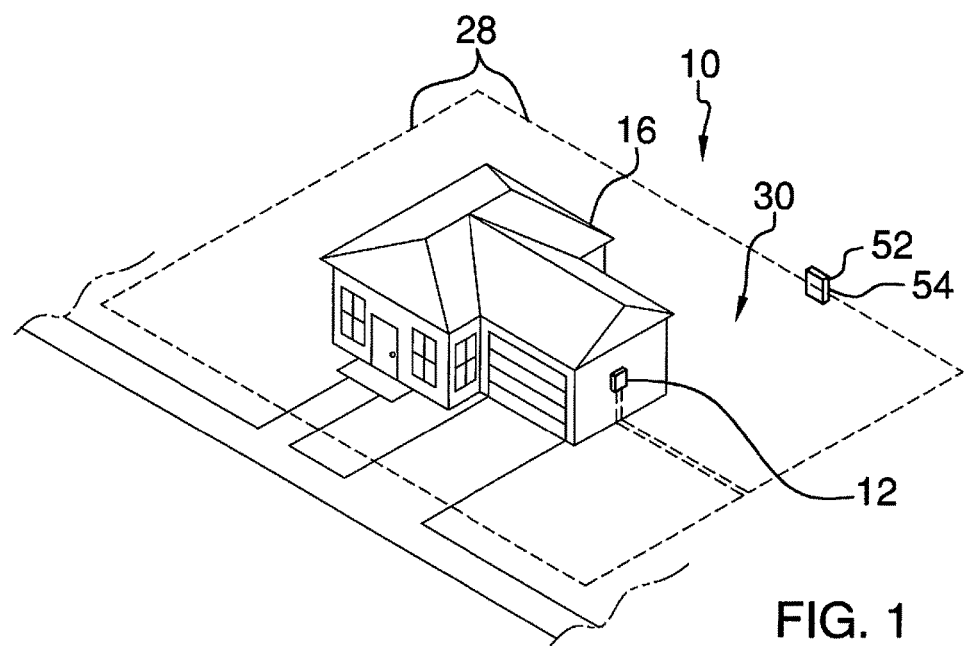
FIG. 1 is a perspective view of a perimeter defense assembly according to an embodiment of the disclosure.
Figure 2:
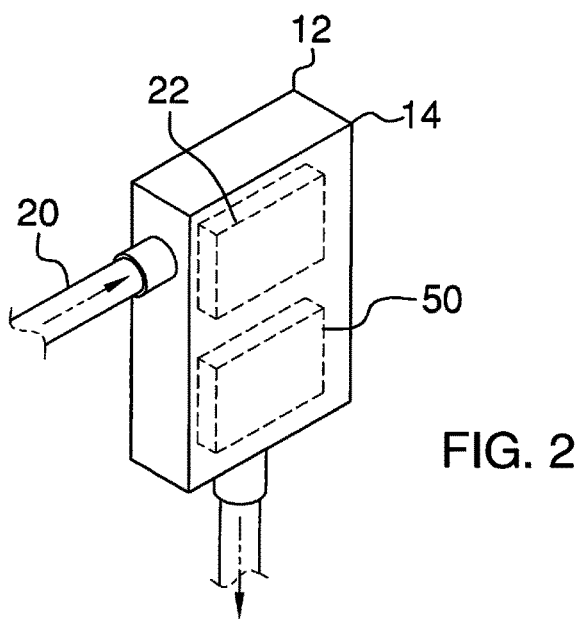
FIG. 2 is a front perspective view of an embodiment of the disclosure.
Figure 3:
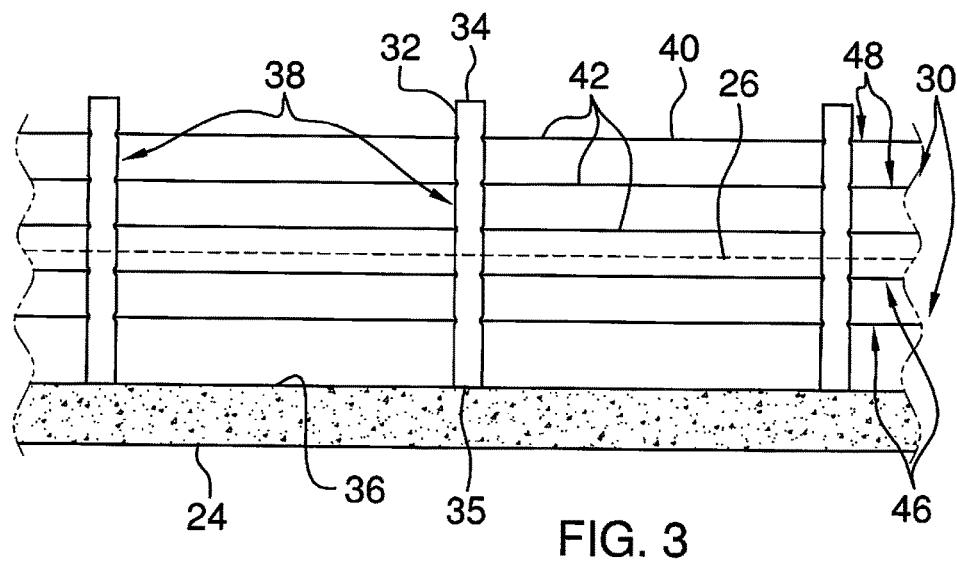
FIG. 3 is a front view of an embodiment of the disclosure.
Figure 4:
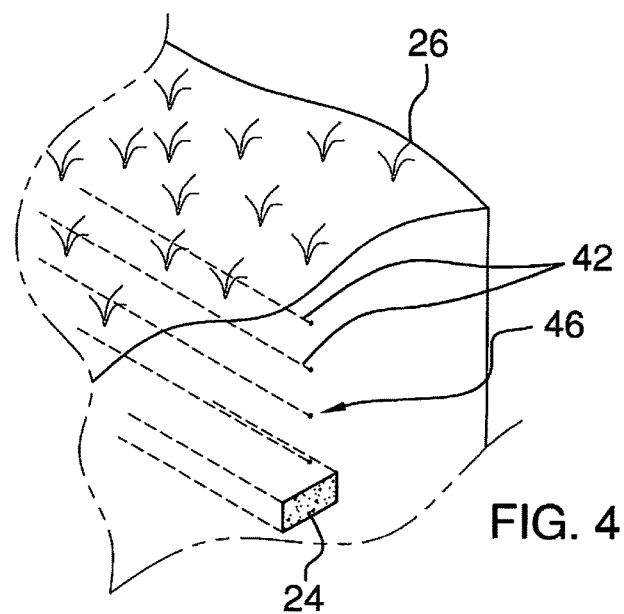
FIG. 4 is a top perspective view of an embodiment of the disclosure.
Figure 5:
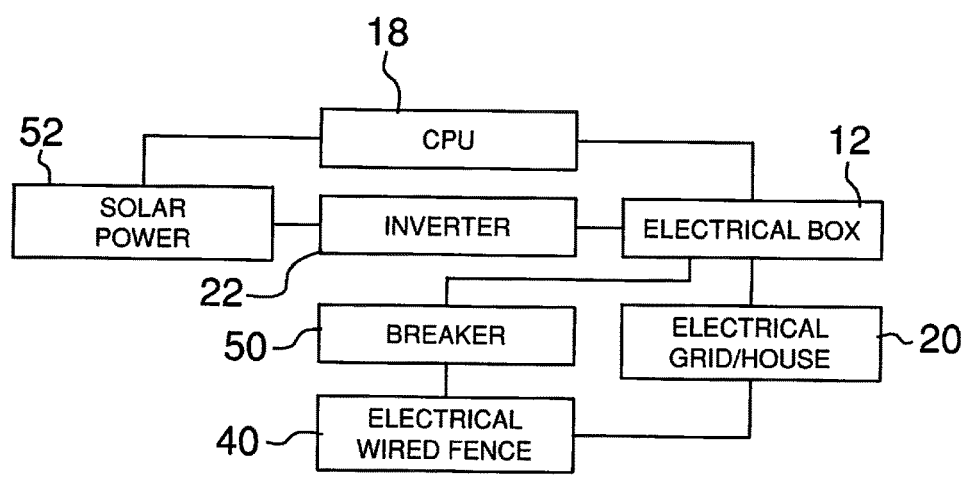
FIG. 5 is a schematic view of an embodiment of the disclosure.

With reference now to the drawings, and in particular to FIGS. 1 through 5 thereof, a new perimeter defense device embodying the principles and concepts of an embodiment of the disclosure and generally designated by the reference numeral 10 will be described.

As best illustrated in FIGS. 1 through 5, the perimeter defense assembly 10 generally comprises a control housing 12. An outer wall 14 of the control housing 12 has a height that is greater than a width of the outer wall 14 of the control housing 12. The control housing 12 may have a rectangular parallelepiped shape that may have a height between 15 cm and 20 cm, a width between 10 cm and 15 cm and a depth between 5 cm and 7 cm. Moreover, the control housing 12 is coupled to a building 16. The building 16 may be a house of any conventional design.

A processor 18 is coupled to the control housing 12. The processor 18 may be an electronic processor of any conventional design. Continuing, the processor 18 is electrically coupled to the building electrical system 20. An inverter 22 is coupled to the control housing 12. The inverter 22 is electrically coupled to the processor 18. Additionally, the inverter 22 may be an electrical inverter of any conventional design and may have an output between 1000 W and 12000 W.

A base 24 is provided. The base 24 has a length that is greater than a height of the base 24. Moreover, the base 24 has an elongated rectangular parallelepiped shape. The base 24 is positioned beneath a support surface 26. Additionally, the support surface 26 may be ground. Lastly, the base 24 may be comprised of a rigid and non conductive material such as concrete or other similar material.

The base 24 is one of a plurality of bases 28. Further, the plurality of bases 28 is arranged to form a geometric shape around an area 30. The geometric shape may be a rectangle. Moreover, the area 30 may be a yard around the building 16.

A support 32 is elongated along a longitudinal axis extending through a top end 34 and a bottom end 35 of the support 32. The support 32 is coupled to and extends upwardly from a top side 36 of the base 24. Further, the support 32 extends above the support surface 26. Lastly, the support 32 may have a height between 120 cm and 150 cm.

The support 32 is one of a plurality of the supports 38. Continuing, the plurality of supports 38 is evenly distributed along the top side 36 of each of the plurality of bases 28. The plurality of supports 38 are evenly distributed around the area 30. Finally, the plurality of supports 28 may each be spaced apart a distance between 90 cm and 215 cm.

A wire 40 is coupled between each of the plurality of supports 38. The wire 40 completely surrounds the area 30. Moreover, the wire 40 is comprised of an electrically conductive material. The wire 40 is electrically coupled to the processor 18. Additionally, the wire 40 is energized so the wire 40 may repel an intruder. The intruder may be a burrowing animal. Further, the intruder may be a walking animal.

The wire 40 is one of a plurality of the wires 42. Further, the plurality of wires 42 is evenly distributed between the top end 34 and the bottom end 35 of each of the plurality of supports 38. The plurality of wires 42 comprises a pair of sets of the plurality of wires 44. A first one of the pair of sets of wires 46 is positioned beneath the support surface 26. Moreover, a second one of the pair of sets of wires 48 is positioned above the support surface 26.

A breaker 50 is coupled to the control housing 12. The breaker 50 is electrically coupled between the processor 18 and the building electrical system 20. Moreover, the breaker 50 may be a circuit breaker of any conventional design. The breaker 50 selectively de-energizes the plurality of wires 42.

A backup power supply 52 is electrically coupled to the inverter 22. The backup power supply 52 may comprise a solar panel 54 of any conventional design. Further, the backup power supply 52 is positioned to have exposure to the sun. The backup power supply 52 provides electrical power to the inverter 22 if the building electrical system 20 experiences a failure.

In use, the plurality of bases 28 are buried beneath the support surface 26 and arranged in a selected geometric shape. The plurality of wires 42 repels the intruder so the area 30 is kept clear of the intruder. Moreover, the breaker 50 is used to de-energize the plurality of wires 42 at any selected time. The backup power supply 52 may be actuated at any time to provide power to the plurality of wires 42 instead of the building electrical system 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A perimeter defense assembly for preventing burrowing and ambulatory intruders from entering an area, said assembly comprising:
   a control housing coupled to a building;
   a processor coupled to said control housing;
   an inverter coupled to said control housing, said inverter being operationally coupled to said processor;
   a plurality of bases, each positioned beneath a support surface, each said base having a length being greater than a height of said base such that said base has an elongated rectangular parallelepiped shape, said plurality of bases being arranged to form an enclosed geometric shape around a perimeter of the area;
   a plurality of supports, each coupled to and extending upwardly from a top side of one of said bases such that said support extends above the support surface, said plurality of supports being evenly distributed along a top side of each of said plurality of bases such that said plurality of supports are evenly distributed around the perimeter of the area; and
   a plurality of wires, each coupled to each of said plurality of supports such that said wire completely encloses the perimeter of the area, each said wire being operationally coupled to said processor, wherein each said wire is energized such that said wire is configured to repel the intruder, said plurality of wires being evenly distributed between a top end and a bottom end of each of said plurality of supports, said plurality of wires comprising a pair of sets of the plurality of wires, a first one of the pair of sets being positioned beneath said support surface, a second one of the pair of sets being positioned above said support surface.

2. The assembly according to claim 1 further comprising an outer wall of said control housing having a height being greater than a width of said outer wall of said control housing wherein said control housing has a rectangular parallelepiped shape.

3. The assembly according to claim 1 further comprising said inverter being electrically coupled to said processor.

4. The assembly according to claim 1 further comprising said inverter being electrically coupled to a building electrical system.

5. The assembly according to claim 1 further comprising each said support being elongated along a longitudinal axis extending through a top end and a bottom end of said support.

6. The assembly according to claim 1 further comprising each said wire being electrically coupled to said processor.

7. The assembly according to claim 1 further comprising a backup power supply electrically coupled to said inverter.

8. A perimeter defense assembly for preventing burrowing and ambulatory intruders from entering an area, said assembly comprising:
   an outer wall of a control housing having a height being greater than a width of said outer wall of said control housing, wherein said control housing has a rectangular parallelepiped shape, said control housing being coupled to a building;
   a processor coupled to said control housing;
   an inverter coupled to said control housing, said inverter being electrically coupled to said processor, said inverter being electrically coupled to a building electrical system;
   a plurality of bases, each having a length being greater than a height of said base such that said base has an elongated rectangular parallelepiped shape, each said base being positioned beneath a support surface, said plurality of bases being arranged to form an enclosed geometric shape around a perimeter of the area;
   a plurality of supports, each being elongated along a longitudinal axis extending through a top end and a bottom end of said support, each said support being coupled to and extending upwardly from a top side of one of said bases such that said support extends above the support surface, said plurality of supports being evenly distributed along said top side of each of said plurality of bases such that said plurality of supports are evenly distributed around the perimeter of the area;
   a plurality of wires, each coupled between each of said plurality of supports such that said wire completely surrounds the area, each said wire being electrically coupled to said processor, wherein each said wire is energized such that said wire is configured to repel the intruder, said plurality of wires being evenly distributed between said top end and said bottom end of each of said plurality of supports, said plurality of wires comprising a pair of sets of the plurality of wires, a first one of the pair of sets being positioned beneath said support surface, a second one of the pair of sets being positioned above said support surface; and
   a backup power supply electrically coupled to said inverter.

* * * * *